United States Patent
Kawase et al.

(10) Patent No.: US 6,358,875 B1
(45) Date of Patent: Mar. 19, 2002

(54) SEMICONDUCTIVE CERAMIC MATERIAL, SEMICONDUCTIVE CERAMIC, AND SEMICONDUCTIVE CERAMIC ELEMENT

(75) Inventors: Yoichi Kawase, Omihachiman; Yoshiyuki Yamashita, Shiga-ken; Makoto Matsubara, Omihachiman; Masahiko Kawase, Yokaichi, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/491,589

(22) Filed: Jan. 25, 2000

(30) Foreign Application Priority Data

Jan. 25, 1999 (JP) .............................. 11-015793
Nov. 29, 1999 (JP) .............................. 11-337956

(51) Int. Cl.$^7$ .............................................. C04B 35/50
(52) U.S. Cl. ..................... 501/152; 252/519; 252/521
(58) Field of Search ..................... 501/152; 252/519, 252/521

(56) References Cited

U.S. PATENT DOCUMENTS

| | | | |
|---|---|---|---|
| 4,130,854 A | | 12/1978 | Hertz ........................... 361/304 |
| 5,504,371 A | * | 4/1996 | Niimi et al. ................... 257/703 |
| 5,703,000 A | * | 12/1997 | Nakayama et al. ............ 501/152 |
| 5,846,505 A | * | 12/1998 | Saegusa ......................... 423/263 |
| 6,054,403 A | * | 4/2000 | Kawase et al. ................ 501/152 |
| 6,136,741 A | * | 10/2000 | Nakayama et al. ............ 501/152 |

FOREIGN PATENT DOCUMENTS

EP 0609888 * 8/1994

* cited by examiner

*Primary Examiner*—Karl Group
(74) *Attorney, Agent, or Firm*—Ostrolenk, Faber, Gerb & Soffen LLP

(57) ABSTRACT

A semiconductive ceramic is produced by sintering a semiconductive ceramic material containing a mixed powder of a lanthanum compound and a cobalt compound. The mixed powder has a specific surface area of about 3 m$^2$/g or more, an average primary particle size of about 2.0 μm or less, and an average secondary particle size of about 10 μm or less.

17 Claims, 1 Drawing Sheet

SEMICONDUCTIVE CERAMIC MATERIAL, SEMICONDUCTIVE CERAMIC, AND SEMICONDUCTIVE CERAMIC ELEMENT

BACKGROUND OF THE INVENTION

1. Field of the Invention

The present invention relates to semiconductive ceramics having negative resistance temperature characteristics, and more particularly, the invention relates to a semiconductive ceramic containing a lanthanum-cobalt-based oxide as a major constituent.

2. Description of the Related Art

Conventionally, elements composed of semiconductive ceramics having negative resistance temperature characteristics, in which the resistance decreases as the temperature increases (hereinafter referred to as "NTC elements"), have been used for preventing initial overcurrents. Since the NTC elements have high resistance at room temperature, overcurrents at startup are prevented. As the temperature increases due to self-heating, the resistance decreases, and in the steady state, electric power consumption decreases. Such NTC elements are used for preventing rush currents, delaying the start of motors, etc.

For example, an overcurrent in a switching device may flow at the moment when the switch is turned on. As an element for absorbing such an initial rush current, an NTC element for preventing rush currents is used.

In a gear device in which a lubricant is fed after a motor is started, it is preferable that the rotational speed of the gear be gradually increased by the drive motor so that the lubricant can be spread over the entire gear device. As an element for delaying the start of the motor for a predetermined period of time, an NTC element for delaying the start of motors is used.

As materials having negative resistance temperature characteristics, rare-earth transition element-based oxides are disclosed in "Phys. Rev. B6 [3]1021" by V. G. Bhide, D. S. Rajoria, et al. published in 1972.

Furthermore, Japanese Unexamined Patent Publication No. 7-176406 discloses LaCo-based oxides to which Si, Zr, Hf, Ta, Sn, Sb, W, Mo, Te, Ce and the like are added as semiconductive ceramics in which the resistance is decreased and the B constant is increased.

However, the conventional semiconductive ceramics have the following drawbacks. Because of insufficient reaction between a lanthanum oxide or lanthanum compound and a cobalt oxide, the unreacted lanthanum oxide may remain in a semiconductive ceramic even after firing is performed, resulting in a deviation in molar ratio. The lanthanum oxide in semiconductive ceramics swells over time, which is disadvantageous in view of stability of various properties of ceramic sintered compacts.

SUMMARY OF THE INVENTION

It is an object of the present invention to provide a semiconductive ceramic in which deviation in molar ratio between amounts of lanthanum and cobalt is minimized and properties are more stabilized.

In a first aspect of the present invention, a semiconductive ceramic is produced by sintering a semiconductive ceramic material containing a mixed powder of a lanthanum oxide or a lanthanum compound and a cobalt oxide. The mixed powder has a specific surface area of about 3 $m^2/g$ or more, an average primary particle size of about 2.0 $\mu$m or less, and an average secondary particle size of about 10 $\mu$m or less.

In a second aspect of the present invention, a semiconductive ceramic is produced by sintering a semiconductive ceramic material containing a mixture of a powder of a lanthanum oxide or a lanthanum compound and a powder of a cobalt oxide. The powder of the lanthanum oxide or the lanthanum compound has a specific surface area of about 1 $m^2/g$ or more, an average primary particle size of about 2.0 $\mu$m or less, and an average secondary particle size of about 10 $\mu$m or less. The powder of the cobalt oxide has a specific surface area of about 5 $m^2/g$ or more, an average primary particle size of about 2.0 $\mu$m or less, and an average secondary particle size of about 10 $\mu$m or less.

As used herein, the average particle size is size measured by laser diffraction scattering of a dispersion of the material being determined (i.e., either the mixture or individual constituents of the mixture). Thus, about 100–1000 mg of the powder material to be measured is dispersed in about 250–300 ml of water containing 0.5% of sodium hexametaphosphate and then ultrasound (100W for 3 minutes) is applied before measuring. To determine primary size, the material is jet milled to break up agglomerates before being dispersed whereas to determine secondary size, it is not jet milled.

By specifying the compositions as described above, deviation in molar ratio between amounts of lanthanum and cobalt can be minimized. That is, by increasing the specific surface area of the semiconductive ceramic material and decreasing the particle size, reactivity between lanthanum and cobalt can be increased and the amount of unreacted lanthanum can be decreased during sintering.

In a third aspect of the present invention, a semiconductive ceramic element includes a semiconductive ceramic according to the first aspect or the second aspect of the present invention and electrodes formed at surfaces of the semiconductive ceramic. By constructing such a structure, the semiconductive ceramic element has a high B constant and low resistance in the steady state.

The semiconductive ceramic element is preferably used for preventing rush currents or delaying the start of motors. In such applications, electrical properties of the semiconductive ceramic element can be utilized effectively.

DESCRIPTION OF THE PREFERRED EMBODIMENTS

Figure 1:
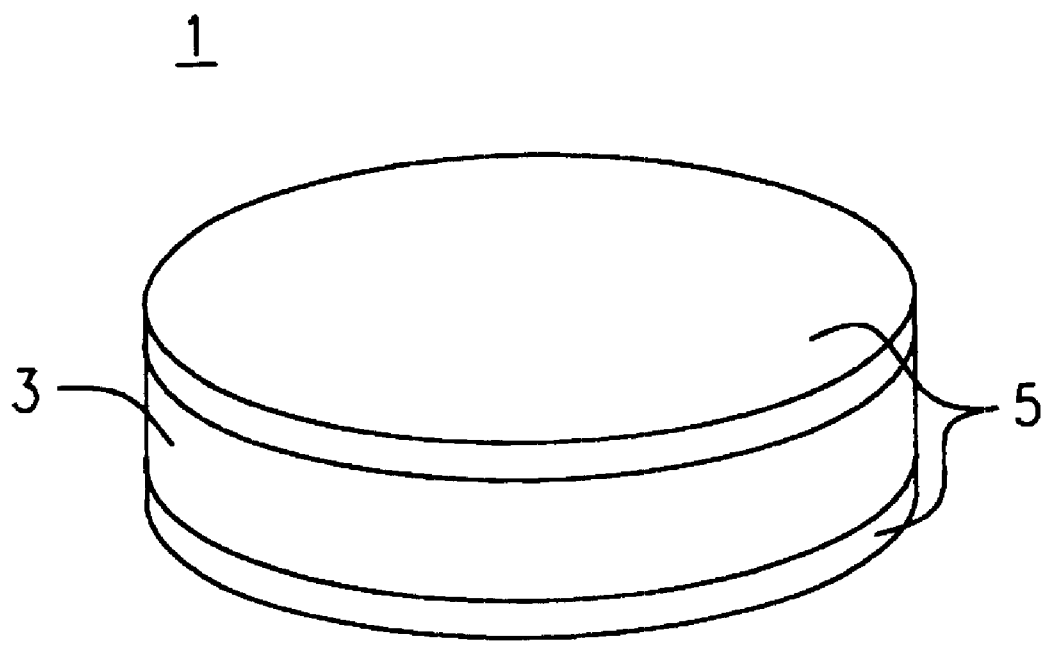
FIG. 1 is a perspective view which schematically shows a semiconductive ceramic element in the present invention.

A semiconductive ceramic of the present invention is produced by sintering a semiconductive ceramic material containing a lanthanum oxide or a lanthanum compound, which has a specific surface area of about 1 $m^2/g$ or more, an average primary particle size of about 2.0 $\mu$m or less, and an average secondary particle size of about 10 $\mu$m or less, and a cobalt oxide, which has a specific surface area of about 5 $m^2/g$ or more, an average primary particle size of about 2.0 $\mu$m or less, and an average secondary particle size of about 10 $\mu$m or less. Alternatively, the semiconductive ceramic material has a specific surface area of about 3 $m^2/g$ or more, an average primary particle size of about 2.0 $\mu$m or less, and an average secondary particle size of about 10 $\mu$m or less. The properties of the lanthanum oxide or compound and the cobalt oxide described above are the values before calcination. The mixture of the lanthanum oxide or compound and the cobalt oxide is referred to as a "semiconductive ceramic material". By calcining and further firing the semiconductive ceramic material, a semiconductive ceramic is obtained.

Examples of the lanthanum oxide or compound include $La_2O_3$ and $La(OH)_3$.

Examples of the cobalt oxide include $Co_3O_4$.

The present invention will be described in more details based on examples.

EXAMPLE 1

A method for producing a semiconductive ceramic and a semiconductive ceramic element will be described. FIG. 1 is a perspective view which schematically shows a semiconductive ceramic element in the present invention.

As starting materials, $La_2O_3$ and $Co_3O_4$ were prepared. The $Co_3O_4$ powder and $La_2O_3$ powder were weighed so that the molar ratio of La to Co was 0.95. The weighed powders were subjected to wet mixing by a ball mill using nylon balls, followed by dewatering and drying, and mixed powders (semiconductive ceramic material) as shown in Table 1 were obtained. The specific surface area and average particle size of the mixed powders were varied by a dry grinder, a pulverizer or the like. A desired primary average particle size and a desired secondary average particle size may be obtained by appropriately selecting the mixing time, the extent of dewatering, drying time, etc.

The individual mixed powders were calcined at 1,000° C. for 2 hours and then ground by a mill to obtain calcined powders. The calcined powders were subjected to X-ray diffraction analysis and the peak intensity of $LaCoO_3$ was measured. X-ray diffraction analysis was also performed with respect to the calcined powders in which pure water was added and dried and the peak intensity of $La(OH)_3$ was measured. The peak intensity ratio $[La(OH)_3 2\theta=27.9°]/[LaCoO_3 2\theta=40.6°]$ was calculated.

Next, a binder was added to the calcined powders and wet mixing was performed again by a ball mill using nylon balls for 5 hours, followed by filtration and drying, and thus binder mixtures were obtained. The binder mixtures were pressed into disks to form green compacts and the green compacts were fired in air at 1,400° C. for 2 hours to obtain sintered compacts (semiconductive ceramics).

After the sintered compacts were left in a wet atmosphere for 3,000 hours, the appearance of the sintered compacts was observed to check about the occurrence of failure such as cracks and breaks.

Furthermore, as shown in FIG. 1, Ag—Pd electrodes 5 were baked on both principal surfaces of the sintered compact 3 and a semiconductive ceramic element 1 was obtained. The semiconductive ceramic element 1 can be used, for example, for an electronic component for preventing rush currents or smoothly starting motors.

The measurement results are shown in Table 1.

With respect to sample Nos. 2 to 6, since the peak intensity ratio of calcined powders, $[La(OH)_3 2\theta=27.9°]/[LaCo_3O_2=40.6°]$, is small, the amount of unreacted La is small, and thus there is a small deviation in molar ratio between La and Co. No crack or break is observed in the shelf life test in the wet atmosphere after firing.

With respect to these samples, the specific surface area of the semiconductive ceramic material is 3 $m^2/g$ or more. When the specific surface area is about 5 $m^2/g$ or more, the peak intensity ratio is 0.07 or less, which is more preferable. When the specific surface area is 20 $m^2/g$ or more, the peak intensity ratio is 0.02 or less, which is most preferable.

The average primary particle size of the semiconductive ceramic material is about 2.0 $\mu$m or less. When the average particle size is 1.3 $\mu$m or less, the peak intensity ratio is 0.07 or less, which is more preferable. When the average particle size is about 0.8 $\mu$m or less, the peak intensity ratio is 0.02 or less, which is most preferable.

The average secondary particle size of the semiconductive ceramic material is about 10 $\mu$m or less. When the average particle size is about 2.5 $\mu$m or less, the peak intensity ratio is 0.10 or less, which is more preferable.

EXAMPLE 2

Semiconductive ceramics were produced in a manner similar to that in Example 1 except that $La_2O_3$ and $Co_3O_4$ having specific surface areas and average primary and secondary particle sizes shown in Table 2 were used as starting materials. Resultant mixed powders, calcined powders, and semiconductive ceramics were evaluated in a manner similar to that in Example 1. The results are shown in Table 2.

With respect to sample Nos. 12 to 15 and 18 to 22, since the peak intensity ratio of calcined powders, $[La(OH)_3 2\eta=27.9°]/[LaCoO_3 2\theta=40.6°]$, is small, the amount of unreacted La is small and thus there is a small deviation in molar ratio between La and Co. No crack or break is observed in the shelf life test in the wet atmosphere after firing.

With respect to these samples, the specific surface area of the lanthanum oxide or lanthanum compound is 1 $m^2/g$ or more. More preferably, the specific surface area is about 3 $m^2/g$ or more.

The average primary particle size of the lanthanum oxide or lanthanum compound is about 2.0 $\mu$m or less. More preferably, the average primary particle size is about 0.7 $\mu$m or less.

The average secondary particle size of the lanthanum oxide or lanthanum compound is about 10 $\mu$m or less. More preferably, the average secondary particle size is about 2 $\mu$m or less.

The specific surface area of the cobalt oxide is about 5 $m^2/g$ or more. More preferably, the specific surface area is about 10 $m^2/g$ or more.

The average primary particle size of the cobalt oxide is about 2.0 $\mu$m or less. More preferably, the average primary particle size is about 1.3 $\mu$m or less.

The average secondary particle size of the cobalt oxide is about 10 $\mu$m or less. More preferably, the average secondary particle size is about 5 $\mu$m or less.

While the invention has been described in detail and with reference to specific examples thereof, it will be apparent to one skilled in the art that various changes and modifications can be made therein without departing from the spirit and scope thereof.

TABLE 1

| | Properties of Mixed Powder | | | Characteristics of Calcined Powder | Characteristics of Sintered Compact |
|---|---|---|---|---|---|
| Sample No. | Specific Surface Area (m²/g) | Average Particle Size | | Peak Intensity Ratio in X-ray analysis [La(OH)₃2θ = 27.9°] [LaCoO₃2θ = 40.6°] | Failure of Sintered Compact in Shelf Test in Wet Atmosphere |
| | | Primary Particle (μm) | Secondary Particle (μm) | | |
| *1 | 1.0 | 2.5 | 2.5 | 0.62 | Yes |
| 2 | 3.0 | 2.0 | 2.5 | 0.10 | No |
| 3 | 5.0 | 1.3 | 2.5 | 0.07 | No |
| 4 | 20.0 | 0.8 | 2.5 | 0.02 | No |
| 5 | 3.0 | 2.0 | 5.0 | 0.12 | No |
| 6 | 3.0 | 2.0 | 10.0 | 0.13 | No |
| *7 | 3.0 | 2.3 | 15.0 | 0.70 | Yes |

TABLE 2

| | Properties of La₂O₃ | | | Properties of Co₃O₄ | | | Characteristics of Calcined Powder | Characteristics of Sintered Compact |
|---|---|---|---|---|---|---|---|---|
| Sample No. | Specific Surface Area (m²/g) | Average Particle Size | | Specific Surface Area (m²/g) | Average Particle Size | | Peak Intensity Ratio in X-ray analysis [La(OH)₃2θ = 27.9°] [LaCoO₃2θ = 40.6°] | Failure of Sintered Compact in Shelf Test in Wet Atmosphere |
| | | Primary Particle (μm) | Secondary Particle (μm) | | Primary Particle (μm) | Secondary Particle (μm) | | |
| *11 | 0.7 | 1.7 | 2.0 | 10.0 | 1.3 | 3.0 | 0.70 | Yes |
| 12 | 1.0 | 2.0 | 2.0 | 10.0 | 1.3 | 3.0 | 0.11 | No |
| 13 | 3.0 | 0.7 | 2.0 | 10.0 | 1.3 | 3.0 | 0.07 | No |
| 14 | 1.0 | 2.0 | 5.0 | 10.0 | 1.3 | 3.0 | 0.12 | No |
| 15 | 1.0 | 2.0 | 10.0 | 10.0 | 1.3 | 3.0 | 0.13 | No |
| *16 | 1.0 | 2.3 | 15.0 | 10.0 | 1.3 | 3.0 | 0.80 | Yes |
| *17 | 3.0 | 0.7 | 2.0 | 2.0 | 2.5 | 3.0 | 0.70 | Yes |
| 18 | 3.0 | 0.7 | 2.0 | 5.0 | 2.0 | 3.0 | 0.11 | No |
| 19 | 3.0 | 0.7 | 2.0 | 10.0 | 1.3 | 3.0 | 0.07 | No |
| 20 | 3.0 | 0.7 | 2.0 | 20.0 | 0.8 | 3.0 | 0.02 | No |
| 21 | 3.0 | 0.7 | 2.0 | 5.0 | 2.0 | 5.0 | 0.12 | No |
| 22 | 3.0 | 0.7 | 2.0 | 5.0 | 2.0 | 10.0 | 0.13 | No |
| *23 | 3.0 | 0.7 | 2.0 | 5.0 | 2.3 | 15.0 | 0.80 | Yes |

What is claimed is:

1. A sinterable semiconductive ceramic material comprising a mixed powder of a lanthanum compound and a cobalt compound, wherein the mixed powder has a specific surface area of about 3 m²/g or more, an average primary particle size of about 2.0 μm or less and an average secondary particle size of about 10 μm or less.

2. A sinterable semiconductive ceramic material according to claim 1, wherein the mixed powder has a specific surface area of about 5 m²/g or more.

3. A sinterable semiconductive ceramic material according to claim 2, wherein the mixed powder has an average primary particle size of about 1.3 μm or less and an average secondary particle size of about 2.5 μm or less.

4. A sinterable semiconductive ceramic material according to claim 3, wherein the mixed powder has a specific surface area of about 20 m²/g or more and an average primary particle size of about 0.8 μm or less.

5. A sinterable semiconductive ceramic material according to claim 1, wherein the mixed powder has a specific surface area of about 20 m²/g or more.

6. A sinterable semiconductive ceramic material according to claim 1, wherein the mixed powder has an average primary particle size of about 1.3 μm or less.

7. A sinterable semiconductive ceramic material according to claim 1, wherein the mixed powder has an average primary particle size of about 0.8 μm or less.

8. A sinterable semiconductive ceramic material according to claim 1, wherein the mixed powder has an average secondary particle size of about 2.5 μm or less.

9. A sinterable semiconductive ceramic material according to claim 1, wherein the powder of the lanthanum compound has an average primary particle size of about 2.0 μm or less and an average secondary particle size of about 10 μm or less, and the powder of the cobalt compound has a specific surface area of about 5 m²/g or more, an average primary particle size of about 2.0 μm or less and an average secondary particle size of 10 μm or less.

10. A sinterable semiconductive ceramic material according to claim 9, wherein the powder of the lanthanum compound has a specific surface area of about 3 m²/g or more and the powder of the cobalt compound has a specific surface area of about 10 m²/g or more.

11. A sinterable semiconductive ceramic material according to claim 10, wherein the powder of the lanthanum compound has an average primary particle size of about 0.7 μm or less and the powder of the cobalt compound has an average primary particle size of about 1.3 μm or less.

12. A sinterable semiconductive ceramic material according to claim 11, wherein the powder of the lanthanum compound has an average secondary particle size of about 2 μm or less and the powder of the cobalt compound has an average secondary particle size of about 5 μm or less.

13. A sinterable semiconductive ceramic material according to claim 12, wherein the lanthanum compound is $La_2O_3$ and the cobalt compound is $Co_3O_4$.

14. A sinterable semiconductive ceramic material according to claim 1, wherein the lanthanum compound is $La_2O_3$.

15. A sinterable semiconductive ceramic material according to claim 1, wherein the cobalt compound is $Co_3O_4$.

16. A method of producing a semiconductive ceramic comprising the steps of:

providing the sinterable semiconductive ceramic material of claim 1;

calcining the sinterable semiconductive ceramic material to form a calcined powder;

combining a binder and the calcined powder; and firing the mixture of the binder and the powder.

17. A method of producing a semiconductive ceramic according to claim 16, wherein the sinterable semiconductive ceramic material is calcined at a temperature of approximately 1,000° C. to 1,400° C.

* * * * *